United States Patent [19]

Aikens

[11] 4,142,227
[45] Feb. 27, 1979

[54] COMBINATION PASSENGER READING LIGHT AND AIR VENTILATOR

[75] Inventor: Wallace R. Aikens, Plano, Tex.

[73] Assignee: Gulton Industries, Inc., Princeton, N.J.

[21] Appl. No.: 799,208

[22] Filed: May 23, 1977

[51] Int. Cl.² .......................................... F21V 29/00
[52] U.S. Cl. .................................... 362/74; 362/373; 362/364
[58] Field of Search ................ 362/74, 264, 269, 294, 362/372, 373, 364, 365

[56] References Cited

U.S. PATENT DOCUMENTS

| | | | |
|---|---|---|---|
| 931,673 | 8/1909 | Boyle | 362/302 |
| 2,153,242 | 4/1939 | Dreyfuss | 362/74 |
| 2,554,258 | 5/1951 | Lundquist | 362/364 |
| 2,999,150 | 9/1961 | Kallel | 362/74 |
| 3,518,420 | 6/1970 | Kripp | 362/364 X |
| 3,653,021 | 3/1972 | Litman et al. | 362/253 X |

Primary Examiner—J. D. Miller
Assistant Examiner—Peter S. Wong
Attorney, Agent, or Firm—Darby & Darby

[57] ABSTRACT

A combination orientable light and ventilating fixture includes a support and a ball housing adjustably mounted therein, the ball housing including front and rear openings and an inner chamber. A socket assembly for an electric lamp is mounted on the housing behind the rear opening and held in spaced relationship from the housing. A bezel element is removably secured to the ball housing at the front opening. A plenum or equivalent arrangement may be mounted on the rear of the support to cover the socket assembly and the rear opening of the ball housing, so that air may pass through the plenum and ball housing. A reflector for the electric lamp is securable to the removable bezel element at any of a plurality of locations axially within the chamber of the ball housing, so that its position relative to the electric lamp may be selected to vary the divergence of light emanating from the fixture. The bezel element may include an inner shield integral therewith and adapted to intercept a portion of light produced by the lamp, to eliminate glare. Various further structural arrangements are provided to permit increased angular movement of the housing relative to the opening axis, to provide a limit to such angular movement, and to facilitate removal and easy insertion of the bezel, shield and reflector arrangement.

15 Claims, 4 Drawing Figures

4,142,227

COMBINATION PASSENGER READING LIGHT AND AIR VENTILATOR

FIELD OF THE INVENTION

The present invention relates to ball housing and support combinations, ventilating fixtures, and adjustable reading lamp fixtures.

BACKGROUND OF THE INVENTION

Vehicles adapted for long distance transportation must provide adequate sources of lighting and ventilation for passengers. For example, most airplanes and many buses in commercial passenger use today include overhead fixtures to provide these functions. Generally, such fixtures include an air outlet, adjustable within a conical region, equipped with a closure valve. Adjacent the air outlet is frequently positioned an incandescent lamp fixture, which sometimes may be adjustable in one or more directions. Advantageously, the number of light or air fixtures overhead corresponds to the number of passenger seats below, so that each passenger may adjust the air flow and lighting as desired.

The principal object of the present invention is to provide a device which may be used as a combination reading lamp and ventilation fixture.

A further object is to provide an improved support, ball housing, and bezel element combination, particularly useful in such a fixture, whereby the ball housing may be oriented over a wider range of positions by the passenger than has been heretofore possible.

Another object is to provide an adjustable reading lamp, particularly useful in such a fixture, which provides for the simple adjustment of the lightbeam pattern.

A further object is to provide a reading lamp fixture which may be adjustable by a passenger in a transportation vehicle and which may be easily serviced.

SUMMARY OF THE INVENTION

These and other objects are achieved by providing a ball housing element rotatably adjustably mounted within the circular opening of a support, the ball housing having front and rear openings and defining an inner chamber. A socket assembly adapted to releasably engage an electric lamp is mounted at the rear opening of the ball housing, so that the lamp may be inserted to the socket assembly through the front opening of the housing. An air passage is defined between the inner chamber of the ball housing and the socket assembly. A plenum may cover the socket assembly, passage and rear portion of the ball housing, and may communicate with a suitable device such as an air conditioner, fan or heater, so that air may be moved in either direction through the plenum, passage and inner chamber of the ball housing.

A bezel element may be mounted on the ball housing to be removable through the front opening thereof. The bezel element may include an integral shield member to intercept a portion of light emanating from the electric lamp, so that glare may be reduced. The bezel element may also include means for mounting a reflector behind the electic lamp, the reflector including a central opening having a diameter greater than the outside diameter of the bulb of the electric lamp, so that the bezel element and reflector may be removed easily from the entire assembly without first disengaging the electric lamp from its socket. Additionally, the bezel element may include means for mounting the reflector at a plurality of positions along the axis of the ball housing, so that by adjusting the axial position of the reflector, the light-beam pattern may be varied.

As described more in detail below, special structural arrangements may be provided to prevent axial withdrawal of the bezel element from the ball housing, but permitting such withdrawal after rotation of the bezel within the housing. Also, special arrangements are provided for enlarging the angular movement of the ball housing with respect to its support, and for providing a limit for such movement.

BRIEF DESCRIPTION OF THE DRAWINGS

The preferred embodiment of the invention is explained below with reference to the accompanying figures in which.

DESCRIPTION OF A PREFERRED EMBODIMENT OF THE INVENTION BALL HOUSING AND SUPPORT ASSEMBLY

Figure 1:
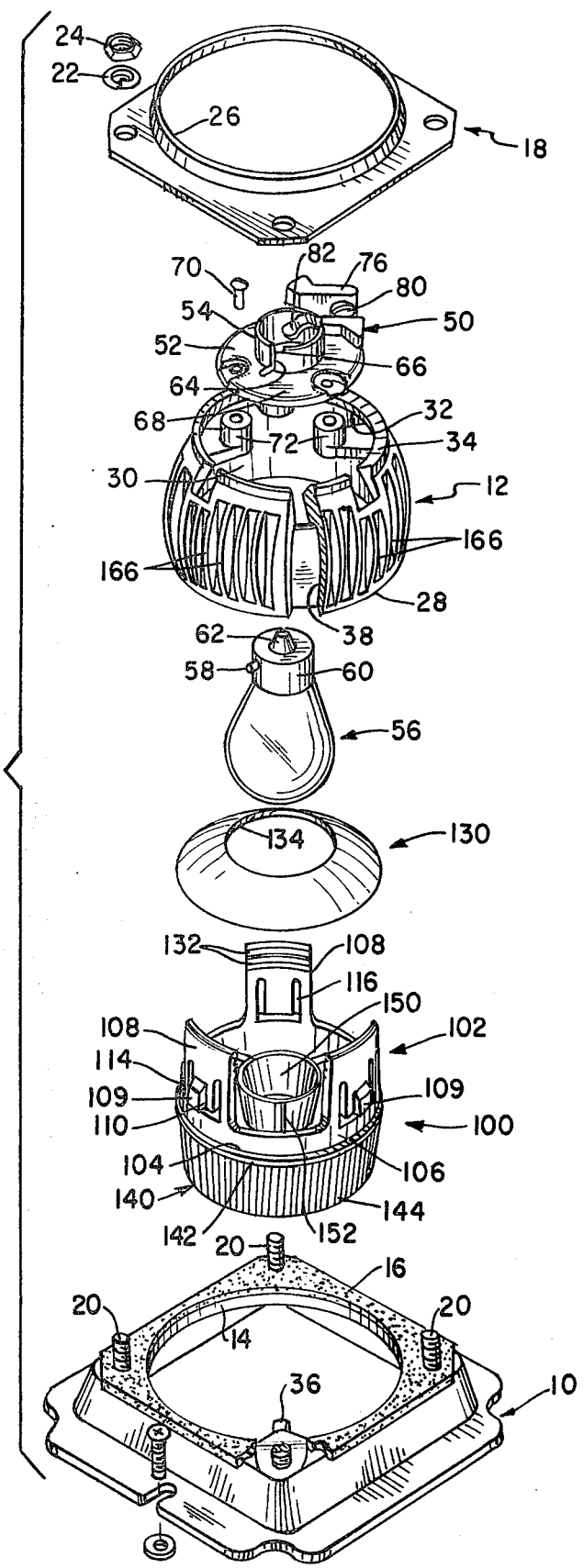
FIG. 1 is an exploded perspective view of a preferred embodiment of the present invention.
Figure 2:
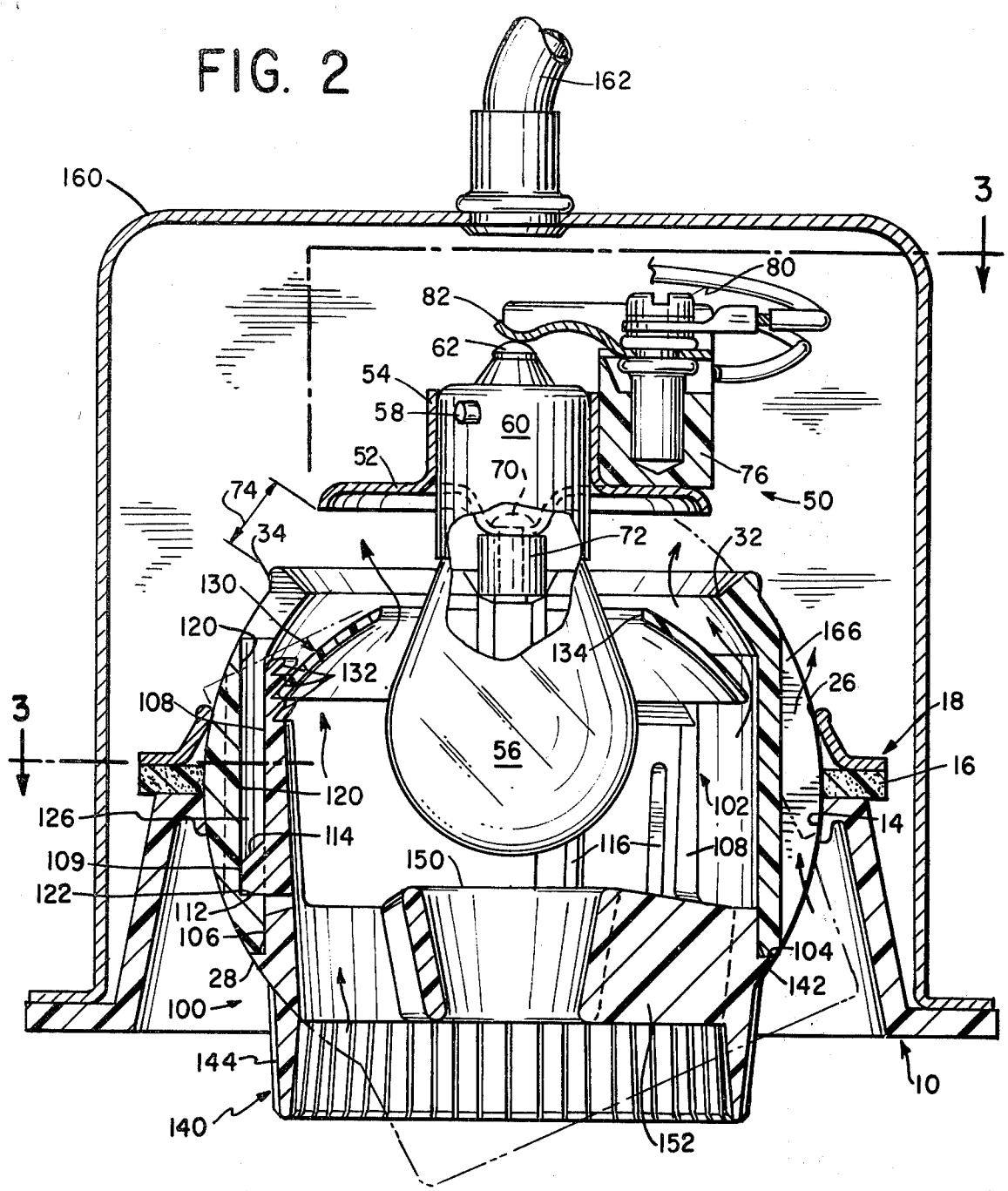
FIG. 2 is a cross-sectional elevational view with parts broken away of the embodiment shown in FIG. 1, including a plenum.

Referring to the drawings, where FIG. 1 shows an exploded rear perspective view of a preferred embodiment, a support 10 is adapted to engage a ball housing 12 by including a circular opening 14 having a diameter slightly smaller than the diameter of the ball housing 12. A flexible gasket 16 is positioned onto the rear surface of the support 10. A clamp ring 18 with a circular opening 26, having a diameter smaller than the diameter of the ball housing, is secured to the support 10 and behind ring 18, as by four screws 20, washers 22 and nuts 24, to hold a portion of the ball housing 12 between support 10 and ring 18, and projecting partially through both opening 14 and ring 18. However, the ball housing 12 may be positioned at a variety of orientations while remaining stable in any position in which it is left, since the gasket 16 will exert frictional force on the ball housing to inhibit it from changing position unless deliberately manipulated.

The ball housing 12 includes a circular front opening 28 (shown in FIG. 3), an inner chamber 30 and a circular rear opening 32 parallel to opening 28, the openings being in planes perpendicular to the principal axis of housing 12. The ball housing 12 includes a lip 34 formed thereon immediately adjacent rear opening 32 and extending axially rearward of housing 12 and also substantially completely around the periphery of opening 32. Ball housing 12 is adapted to have its principal axis adjusted to any desired orientation within a conical region. Absent other constraints, the width of the cone is determined by the lip 34, which constrains the ball housing 12 from movement beyond a predetermined angular displacement of the ball housing relative to the axis of the ring opening 26 and support opening 14.

Means are provided to prevent excessive rotational movement of ball housing 12 around its principal axis. While other arrangements are possible, in the preferred embodiment the support 10 includes an anti-rotation projection 36 (see FIG. 3) formed thereon and extending radially inward within circular opening 14 in support 10. While dimensions may vary, satisfactory results are obtained in a preferred embodiment where circular opening 14 is approximately 6 cm. in diameter, and projection 36 extends approximately 2 mm. radially inward from support 10 and is approximately 3 to 4 mm. wide.

A channel 38 is formed longitudinally along the outer surface of ball housing 12 and engages projection 36. The channel 38 includes sidewalls lying in planes containing or substantially parallel to the principal axis of the ball housing 12. The base of channel 38 has a curvature substantially matching the curvature of the outside surface of the ball housing 12. Channel 38 has a depth and width respectively slightly greater than the height and width of projection 36. Conveniently, channel 38 extends from front opening 28 of ball housing 12 across the outside surface thereof to rear opening 32. In a preferred embodiment having the dimensions specified above, the channel has a depth of approximately 3 mm. and a width of approximately 8 mm. This arrangement constrains the rotational movement of ball housing 12 about its principal axis beyond a predetermined and preferably small angle. Ball housing 12 may be rotated until projection 36 is met by a sidewall of channel 38. However, projection 36 and channel 38 do not interfere with the orientation of the axis of housing 12 within the predetermined conical region.

SOCKET ASSEMBLY

A socket assembly 50 is mounted on ball housing 12 at the rear portion thereof. Socket assembly 50 includes an electrically conductive mounting member 52 which may be approximately in the shape of a top hat. Member 52 includes a first cylindrical portion 54 adapted to engage the base of an electric light bulb 56, illustratively of the bayonet type. Bulb 56 includes radial projections 58 formed on an electrically conductive base 60 and a central contact 62 electrically insulated from the base 60. Mounting member 52 includes on its cylindrical portion 54 channels 64 positioned to allow the projections 58 of the bulb to pass through the sidewalls of cylindrical portion 54, which also includes notches 66 at the rear portion thereof and adjacent channels 64. Notches 66 are adapted to receive projections 58, so that the bulb 56 may be inserted through the inner chamber 30 of ball housing 12, allowing projections 58 to pass through channels 64, after which the bulb may be slightly rotated to position the projections 58 in the respective notches 66.

Mounting member 52 also includes a second portion 68 illustratively in the shape of a flat ring at the end of first portion 54 opposite notches 66. In the preferred embodiment, the flat ring portion 68 has an outside diameter smaller than the diameter of rear opening 32 and is suitably mounted on ball housing 12, as by means of a plurality of rivets 70 passing through flat ring portion 68 into standoff mounts 72 formed on the rearward portion of ball housing 12. Standoff mounts 72 extend radially inward of the rear opening 32 and, if desired, may also extend axially rearward of the ball housing. Accordingly, the mounting member 52 is held in spaced relationship from the ball housing 12 to form a substantially annular channel 74 therebetween. An air passage may be formed by alternative means, however, such as one or more openings in ring portion 68 or housing 12.

A terminal base 76 formed of an electrically insulating material is mounted on the flat portion 68 of mounting member 52. Terminal base 76 includes first and second terminals 78, 80 for connecting a suitable power source to the light bulb 56. First terminal 78 is electrically contiguous to flat ring portion 68. A second terminal 80 also mounted on base 76 supports a lug 82 formed of an electrically conductive material, which lug extends from the second terminal 80 to the rear center of cylindrical portion 54, so that when light bulb 56 is inserted, lug 82 engages the central contact 62 of the bulb, and, upon being displaced slightly rearward by the bulb, provides a force resiliently urging the bulb forward so that projections 58 are firmly engaged in notches 66.

BEZEL ELEMENT ASSEMBLY

Figure 3:
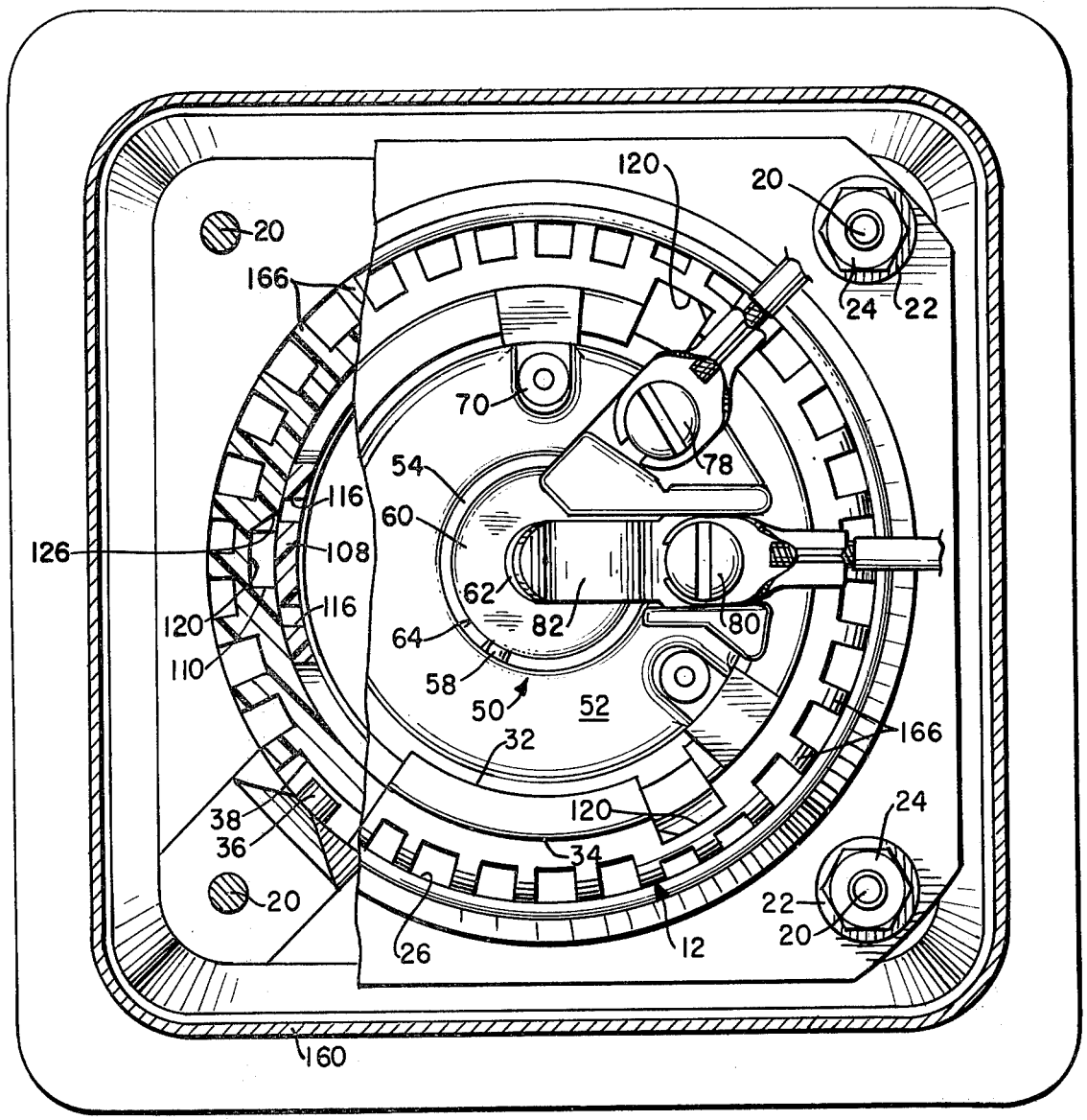
FIG. 3 is a plan view partly in section taken along line 3—3 of FIG. 2.
Figure 4:
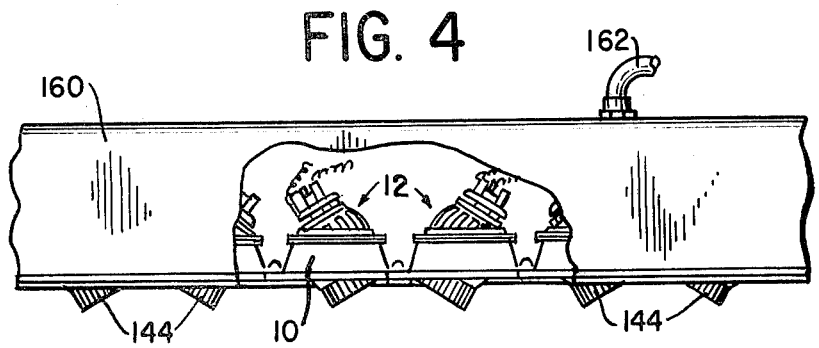
FIG. 4 is an elevational view with parts broken away of a plurality of combination reading light and air ventilators mounted in a rack.

Referring to FIGS. 1 and 3, a bezel element 100 is removably secured to and mostly within ball housing 12. The bezel element 100 includes a first portion 102 insertable through front opening 28 into the inner chamber 30 of ball housing 12. Means are provided on the first portion 102 to cooperate with means provided on the inside surface of inner chamber 30 to removably secure the bezel element 100 to the ball housing 12. Illustratively, first portion 102 includes a shoulder 104 extending radially outward from a neck portion 106. Neck 106 has a diameter slightly smaller than the diameter of opening 28 and than the inside diameter of chamber 30. Shoulder 104, in comparison with opening 28, has a slightly larger diameter so that bezel first portion 102 may be inserted axially into chamber 30 through front opening 28 until the shoulder 104 meets the outer perimeter of ball housing 12 forming opening 28, thereby preventing further movement of the bezel 100 axially inward.

A plurality of substantially flat fingers 108 are formed on bezel element 100 and extend from neck 106 axially rearward. Each finger includes an integral spring detent 109 formed thereon and extending radially outwardly of the bezel element 100. Each spring detent 109 includes a pair of sidewalls 110, a front end wall 112, and a rear end wall 114. A cutout 116, illustratively shaped as a U, may extend around each detent 109. Preferably the bezel element first portion 102 is formed of a resilient material such as a synthetic polymeric material (for example, polystyrene, polyethylene, or polypropylene), so that the detent 109 and the supporting structure of finger 108 may be displaced slightly without damage due to the natural resilience of the material. Consequently, each detent 109 will exert a force radially outward if displaced radially inward.

One or more channels 120 are formed on the inside surface of the ball housing 12. In the preferred embodiment the number of channels 120 is the same as the number of detents 109; however, it is not necessary to have a corresponding number, so long as at least one detent 109 and at least one channel 120 are provided. Each channel 120 includes an end wall 122 located preferably at a distance from the front opening 28 of the ball housing 12 substantially equal to the distance between spring detent front end wall 112 and shoulder 104. After bezel element 100 is inserted into ball housing chamber 30, it may be adjusted so that spring detents 109 overlie corresponding channels 120. The width of each channel 120 at the base thereof is approximately equal to the width of each spring detent 109, so that the resilience of the material forming the bezel first portion 102 will urge the spring detents 109 into the channels 120. The end wall 122 of channel 120 meets the front end wall 112 of detent 109, so that bezel element 100 may not be axially withdrawn from the ball housing 12 until after disengagement of the detents 109.

Each channel includes a pair of sidewalls 124, 126. In a preferred embodiment, sidewall 124 is substantially radial with respect to the principal axis of the ball housing 12, while sidewall 126 is slanted with respect to the axis. Specifically, sidewall 126 is slanted so that channel 120 has a width at its base smaller than its width at its top, the slanted wall being adapted to serve as a ramp. By this arrangement, after the first portion 102 of the bezel element 100 is inserted into the inner chamber 30 of ball housing 12, with accompanying bending of detents 109 inward, bezel element 100 may be rotated around the axis of the ball housing 12 until the spring detents 109 fall into the corresponding channels 120. To disengage the bezel element 100, a user may apply a rotational torque to the bezel element 100, causing certain of the sidewalls 110 of the detents 109 to slide along the slanted channel sidewalls 126, ultimately disengaging each detent 109 from its respective channel 120 by the consequent ramp action. Rotation of the bezel element 100 in the opposite direction will be prevented by the channel radial sidewall 124 meeting the detent radial sidewall 110. After the detents 109 disengage from the corresponding channels 120, the bezel element 100 may be withdrawn axially from the ball housing 12. Alternative arrangements may be divised, so that the bezel element 100 may be rotated in either direction, for example. It is not necessary that the channel sidewalls include a slanted wall; so long as there is either a slanted detent sidewall or a slanted channel sidewall, the detents 109 will be disengaged when the bezel element 100 is rotated about its axis.

To facilitate insertion of the first portion 102 through the front opening 28 of ball housing 12 into its inner chamber 30, each spring detent 109 may include a slanted rear end wall 114 so that the base of each detent 109 is longer than the top thereof, to act as a ramp.

Fingers 108 of the bezel element 100 provide a unique mount for a reflector 130 for light bulb 56. Each of the fingers 108 includes one or more notches 132 on the inside surface thereof. Each notch is shaped to support a portion of the outer perimeter of reflector 130, which in cross-section may be elliptical, parabolic, or shaped otherwise as desired. The resilience of the material forming the fingers 108 allows the fingers to be slightly displaced radially outward until the periphery of the reflector 130 is positioned within a desired notch 132. Thereafter, the finger 108 is released, allowing it to return to its original position to engage the reflector 130. In the preferred embodiment, a plurality of axially displaced notches 132 are used on each of the fingers 108, so that the reflector 130 may be put in a variety of positions along the principal axis of the ball housing 12. By varying the axial position of the reflector 130, the beam shape of the light bulb 56 may be adjusted to have a narrow, normal, or wide divergence. Obviously, other equivalent arrangements may be used to engage a reflector 130 which the bezel element 100.

The reflector 130 includes an opening 134 having a diameter greater than the outside diameter of light bulb 56. As a result, the bezel element 100, while still engaging reflector 130, may be disengaged from ball housing 12 even though light bulb 56 remains mounted in the socket assembly 50. In this way, the unit may be easily serviced, such as for replacement of a light bulb or other purposes.

Bezel element 100 also includes a second portion 140 which is positioned outwardly of the ball housing 12 when bezel element 100 is mounted therein. As mentioned above, when bezel element 100 is mounted in ball housing 12, shoulder 104 abuts the outer perimeter of ball housing 12 which forms opening 28. Bezel element second portion 140 includes a ridge 142 extending from shoulder 104 to a trunk portion 144. In a preferred embodiment, ridge 142 forms a substantially smooth continuation of the outer surface of ball housing 12 and tapers radially inward to the trunk portion 144. Accordingly, the second portion 140 of bezel element 100 does not unduly limit the maximum angular displacement of the axis of the ball housing 12 within the support 10 and the support circular opening 14. By this arrangement, in fact, the maximum angular displacement of the ball housing 12 from its axis is made greater than angular displacements heretofore available.

Bezel trunk portion 144 in the preferred embodiment is substantially cylindrical, but may be tapered slightly. Other shapes may be used. The trunk portion 144 may function to direct the flow of air, discussed more fully below, and provides a surface for a user to grip in order to adjust the position of the ball housing 12 with respect to the support 10.

Bezel element 100 may also include an inner light shield 150 integral therewith. As illustratively shown in the drawings, the shield 150 is formed as a hollow truncated cone positoned concentrically within bezel element 100 and supported by shield supports 152 extending from the inside surface of bezel element 100 to the outside surface of the conical shield 150. The shield 150 is oriented so that its smaller opening faces outward, while its larger opening is closer to the light bulb 56 when mounted. Consequently, a portion of the light emanating from light bulb 56 will be intercepted by the inside portion of the conical inner shield 150 to reduce glaring of the light rays. Alternative shapes may be used for shield 150, such as a disc mounted parallel to and concentric with opening 28.

VENTILATOR EQUIPMENT

The described apparatus may be used as an air ventilator by providing a plenum 160 covering the rear portion of ball housing 12. Conveniently, plenum 160 may be secured in an airtight fashion to the rear surface of clamp ring 18, so that plenum 160 will cover socket assembly 50, the generally annular channel 74 between ball housing 12 and socket assembly 50, and the rear of the ball housing 12. Airflow means such as a hose 162 may communicate with plenum 160 and with a distant unit such as a fan, heater, air conditioner, or other device. Consequently, air may be moved in either direction, illustratively from hose 162 to plenum 160, through channel 74, through reflector opening 134 and axially along bulb 56 as well as around the sides of reflector 130 through inner chamber 30 of ball housing 12, past housing front opening 28 and out through trunk portion 144 of bezel element 100. If desired, the outer surface of ball housing 12 may include a plurality of flutes or channels 166 extending longitudinally along the housing. Consequently, air may then also move through flutes 166 on the outside of ball housing 12 and radially outwardly of trunk portion 144.

Electrical connection for the light bulb 56 may be made by running wires through the air hose 162 or alternatively, through an appropriate opening 168 in the plenum 160.

The present invention therefore provides a combination reading light and ventilator fixture. A wide range of orientation of the principal axis of a ball housing with a bezel element is provided where the diameter of the bezel element adjacent the ball housing is smaller than the diameter of the front opening of the housing. The bezel element provides a unique mount for a reflector, and by including a plurality of axially spaced notches formed on a plurality of finger projections, the reflector position may be adjusted to vary the beam spread of a light bulb. The finger projections support a unique bezel element mounting arrangement including at least one spring detent adapted to cooperate with at least one corresponding channel formed on the inside surface of the ball housing. By including an end wall on the channel, and at least one slanted sidewall to act as a ramp on either the detent or channel, a unique mounting arrangement obtains whereby a bezel element is demountably secured within a ball housing. The bezel element and ball housing provide an adjustable reading fixture which may be serviced by simple rotation and axial withdrawal of the bezel element from the housing to give easy access to the light bulb and reflector.

To those skilled in the art it will be apparent that the present invention may take a variety of forms. It is preferred, therefore, that the foregoing description be taken in an illustrative sense, and that the scope of protection afforded be determined by the appended claims.

What is claimed as the invention is:

1. An orientable light and ventilating fixture comprising:
   a housing having a channel extending axially therethrough, said housing being adapted for movement to position an axis thereof at any desired orientation within a conical region;
   a socket assembly mounted on said housing at one end of said housing channel and adapted to engage an electric lamp bulb when inserted in said housing channel from the other end thereof;
   said socket assembly being spaced from said housing to form an airflow channel therebetween;
   a bezel element removably insertable within said housing through the end of said housing channel on the other side of said socket assembly, said bezel element including a manipulatable portion extending outwardly from said housing channel for permitting manual tilting adjustment of the axis of said housing and lamp, said bezel element portion also containing an airflow channel communicating with said housing channel for simultaneously orienting the direction of airflow through said housing channel and
   a reflector mounted on said bezel element and insertable therewith into said housing channel, said reflector having an opening to receive the lamp therethrough and being selectively adjustable on said bezel axially with respect to said lamp bulb thereby to surround selected portions of said lamp upon insertion of said bezel element with said lamp in place.

2. A fixture as in claim 1 wherein said bezel elememt is adapted to hold said reflector at any selected one of a plurality of axially separated positions along the lamp bulb to permit selection of a desired angular spread of light from said lamp.

3. The orientable reading light fixture of claim 1 in which:
   said bezel element comprises support means for holding the reflector around selected portions of said lamp when said lamp is mounted in said socket assembly.

4. The fixture according to claim 3 wherein said support means is adapted to mount said reflector at a selected one of a plurality of positions along an axis of said ball housing, and wherein said bezel element includes an opening therethrough adapted to pass around a lamp of predetermined size.

5. The orientable reading light fixture of claim 1 in which:
   said bezel element includes an inner shield integral with said bezel element and positioned concentrically therewithin and adapted to intercept a portion of light produced by said lamp.

6. The fixture according to claim 5 wherein said inner shield includes a tapered hollow section having front and rear openings.

7. The fixture according to claim 5 wherein said inner shield includes a truncated conical section having larger and smaller circular openings, said larger opening being disposed between said socket assembly and said smaller opening when said bezel element is within said ball housing.

8. The fixture according to claim 1 wherein said socket assembly is spaced from said housing, and includes at least one standoff holding said socket assembly in spaced relationship from said housing to form an annular passage between said socket assembly and said housing.

9. A fixture according to claim 1 further comprising a support for the fixture, a plenum secured to said support and adapted to enclose said socket assembly and means for moving air through said plenum and housing channel.

10. A ball mount comprising:
    a support having a circular opening therein,
    a ball element,
    means for retaining said ball element within said opening,
    an anti-rotation projection on said support and extending radially inward of said circular opening, said projection having a height and a width,
    said ball element including an elongated substantially vertical channel along the outer surface thereof and having a depth greater than the height of said projection and having a width exceeding the width of said pin, said channel including side walls extending in planes containing an axis of said ball element, said projection being engaged in said channel and cooperating therewith to permit said axis to be positioned at any desired orientation within a conical region while preventing substantial rotation of said ball element about said axis.

11. An orientable reading light fixture comprising:
    a support having a circular opening;
    a ball housing having an opening adjustably mounted within said support opening and adapted for movement to position an axis thereof at any desired orientation within a conical region;
    a socket assembly mounted on said ball housing and adapted to engage a lamp to be located within said ball housing;

a bezel element secured to said ball housing opposite said socket assembly, said bezel element having a first portion fitting within said ball housing;

said bezel element also having a substantially cylindrical second portion extending coaxially of the axis of said ball housing and outwardly from said ball housing opening, said bezel element having an annular peripheral shoulder to abut against the outer end of said ball housing and having a curved outwardly flared surface area meeting the exterior surface of said ball housing, the curvature of said surface area being substantially the same as the curvature of said ball housing to form a substantially smooth continuation of the outer surface of said ball housing whereby said housing may be tilted beyond the edge of said support opening until said bezel element second portion contacts said edge.

12. An orientable reading light fixture comprising:
a support having a circular opening;
a ball housing adjustably mounted within said opening and adapted for movement to position an axis thereof at any desired orientation within a conical region;
a socket assembly mounted on said ball housing and adapted to engage a lamp to be located within said ball housing;
a bezel element removably secured to said ball housing opposite said socket assembly, said bezel element having a first portion fitting within said ball housing;
said ball housing including inner and outer surfaces, said inner surface including at least one channel substantially parallel to an axis of said ball housing, said channel having a base, a pair of sidewalls, and an end wall,
said bezel element first portion including at least one spring detent facing outwardly, said detent having a pair of sidewalls adapted to removably engage said channel sidewalls and having an end wall adapted to engage said channel end wall to inhibit axial withdrawal of said bezel element from housing,
at least one of a channel sidewall and a detent sidewall being slanted and non-radial with respect to said ball housing axis, whereby said detent may be disengaged from said channel by axial rotation of said bezel element to disengage said detent from said channel and permit axial withdrawal of said bezel element from said housing.

13. The light fixture according to claim 12 wherein said spring detent is formed integrally with said bezel element first portion, said spring detent also including a second slanted end wall opposite said first end wall, said slanted end wall being adapted to facilitate insertion of said bezel element first portion into the opening of said ball housing and to displace said spring detent during insertion.

14. A ventilated adjustable reading light fixture comprising:
a support having a circular opening;
a hollow ball housing adjustably mounted within said circular opening and having front and rear openings on opposite sides of said support;
a socket assembly mounted on said ball housing proximate said rear opening, said ball housing and socket assembly combination including at least one opening to form an airflow passage from outside said housing past said socket assembly and into the interior of said housing, said socket assembly being adapted to engage a lamp to be located within said ball housing, whereby air may flow through said support past said lamp by way of said front and rear housing openings and between said socket assembly and said ball housing, said socket assembly including:
an electrically conductive mounting member having first and second portions, said first portion being adapted to engage the base of an electric lamp bulb, said second portion including a ring extending around said first portion, said ring being held in spaced relationship from said rear opening of said ball housing to form a substantially annular opening therebetween;
a terminal base formed of an electrically insulating material and mounted upon said ring;
a first terminal positioned on said base and electrically connected to said mounting member;
a second terminal mounted on said terminal base; and
a lug formed of an electrically conductive material and connected to said second terminal, said lug extending from said second terminal to a position proximate said first portion of said mounting member and being positioned to engage a central contact of a lamp adapted for mounting within said socket assembly, whereby electrical connections to said lamp and socket assembly permit substantially unhindered flow of air through said air passage between said socket assembly and said ball housing.

15. A ventilated adjustable reading light fixture comprising:
a support having a circular opening;
a hollow ball housing adjustably mounted within said circular opening and having front and rear openings on opposite sides of said support;
a socket assembly mounted on said ball housing proximate said rear opening, said ball housing and socket assembly combination including at least one opening to form an airflow passage from outside said housing past said socket assembly and into the interior of said housing said socket assembly being adapted to engage a lamp to be located within said ball housing, whereby air may flow through said support and past said lamp by way of said front and rear housing openings and between said socket assembly and said ball housing,
said ball housing including front and rear portions and a plurality of channels formed on the exterior surface thereof, said channels being separated by corresponding ridges, the outer surface of said ridges forming the outer periphery of said housing and contacting said support opening, said channels extending between said front and rear portion of said ball housing, whereby air may flow from the rear portion of said ball housing to the front portion thereof by way of said channels.

* * * * *

UNITED STATES PATENT AND TRADEMARK OFFICE
CERTIFICATE OF CORRECTION

PATENT NO. : 4,142,227

DATED : Feb. 27, 1979

INVENTOR(S) : Wallace R. Aikens

It is certified that error appears in the above-identified patent and that said Letters Patent are hereby corrected as shown below:

Col. 7, line 33, cancel beginning with "1. An orientable light and ventilating fixture" to and including "in place." in col. 7, line 63, and insert the following claim:

1. An orientable light and ventilating fixture comprising:

a housing having a channel extending axially therethrough, said housing being adapted for movement to position an axis thereof at any desired orientation within a conical region;

a socket assembly mounted at one end of said housing channel and defining an airflow passage into said channel, said assembly being adapted to engage an electric lamp bulb extending into said channel;

a bezel element removably insertable within said housing through the other end thereof and containing an airflow channel communicating with said housing channel for orienting the direction of airflow through said housing channel; and a reflector mounted on said bezel element and insertable therewith into said housing channel, said reflector having an opening to receive the lamp therethrough and being selectively adjustable on said bezel axially with respect to said lamp bulb thereby to surround selected portions of said lamp upon insertion of said bezel element with said lamp in place.

UNITED STATES PATENT AND TRADEMARK OFFICE
CERTIFICATE OF CORRECTION

PATENT NO. : 4,142,227

DATED : Feb. 27, 1979

INVENTOR(S) : Wallace R. Aikens

It is certified that error appears in the above-identified patent and that said Letters Patent are hereby corrected as shown below:

Col. 8, line 60, cancel beginning with "11. An orientable reading light fixture comprising:" to and including "edge." in col. 9, line 20, and insert the following claim:

11. An orientable reading light fixture comprising:

a support having an opening;

a ball housing adjustably mounted within said support opening and adapted for movement to position an axis thereof at any desired orientation within a conical region;

a socket assembly mounted at one end of said ball housing and adapted to engage a lamp to be located within said ball housing;

a bezel element engageable with said ball housing opposite said socket assembly, said bezel element having a first portion fitting within said ball housing and a second portion extending outwardly from said ball housing, said bezel including an annular peripheral shoulder to abut against the outer end of said ball housing and having a curved outwardly flared surface area meeting the exterior surface of said ball housing, the curvature of said surface area being substantially the same as the curvature of said ball housing to form a substantially smooth continuation of the outer surface of said ball housing whereby said housing may be tilted beyond the edge of said support opening until said bezel element second portion contacts said edge.

UNITED STATES PATENT AND TRADEMARK OFFICE
CERTIFICATE OF CORRECTION

PATENT NO. : 4,142,227

DATED : Feb. 27, 1979

INVENTOR(S) : Wallace R. Aikens

It is certified that error appears in the above-identified patent and that said Letters Patent are hereby corrected as shown below:

Col. 9, line 21, cancel beginning with "12. An orientable reading light fixture comprising:" to and including "bezel element from said housing." in col. 9, line 54, and insert the following claim:

12. An orientable reading light fixture comprising:

a support having an opening;

a housing adjustably mounted within said opening and adapted for movement to position an axis thereof at any desired orientation within a conical region said housing having a peripheral channel defining sidewalls and an end wall;

a socket assembly mounted at one end of said housing and adapted to engage a lamp to be located within said housing;

a bezel element detachably engageable with said housing opposite said socket assembly, and including at least one spring detent having a pair of sidewalls and a first end wall adapted to removably engage said channel, said channel and detent end walls being engageable to inhibit axial withdrawal of said bezel element from said housing, at least one of a channel sidewall and a detent sidewall being slanted and non-radial with respect to said housing axis, whereby said detent may be disengaged from said channel by axial rotation of said bezel element to disengage said detent from said channel and permit axial withdrawal of said bezel element from said housing.

UNITED STATES PATENT AND TRADEMARK OFFICE
CERTIFICATE OF CORRECTION

PATENT NO. : 4,142,227

DATED : Feb. 27, 1979

INVENTOR(S) : Wallace R. Aikens

It is certified that error appears in the above-identified patent and that said Letters Patent are hereby corrected as shown below:

Col. 9, line 55, cancel beginning with "13. The light fixture according to claim 12" to and including "insertion." in col. 9, line 62, and insert the following claim:

13. The light fixture according to claim 12 wherein said spring detent is formed integrally with said bezel element for insertion into said housing, said spring detent also including a second slanted end wall opposite said first end wall, said slanted end wall being adapted to facilitate insertion of said bezel into said housing and to displace said spring detent during insertion.

Col. 8, line 10, delete "ball".

Col. 8, line 23, delete "5", and substitute therefor "6".

Col. 8, line 27, delete "ball".

Col. 9, line 64, cancel beginning with "14. A ventilated adjustable reading light fixture" to and including "between said socket assembly and said ball housing." in col. 10, line 38, and insert the following claim:

14. A ventilated adjustable reading light fixture comprising:

a support having an opening;

a hollow housing adjustably mounted within said opening and having front and rear openings on opposite sides of

UNITED STATES PATENT AND TRADEMARK OFFICE
CERTIFICATE OF CORRECTION

PATENT NO. : 4,142,227

DATED : Feb. 27, 1979

INVENTOR(S) : Wallace R. Aikens

Page 5 of 7

It is certified that error appears in the above-identified patent and that said Letters Patent are hereby corrected as shown below:

said support;

a socket assembly mounted at one end of said housing proximate said rear opening, to define an airflow passage from outside said housing past said socket assembly and into the interior of said housing, said socket assembly being adpated to engage a lamp to be located within said housing, said socket assembly including:

an electrically conductive mounting member having first and second portions, said first portion being adapted to engage the base of an electric lamp bulb, said second portion including a ring extending around said first portion, said ring being held in spaced relationship from said rear opening of said housing to define said airflow passage;

a terminal base formed of an electrically insulating material and mounted upon said ring;

a first terminal positioned on said base and electrically connected to said mounting member;

a second terminal mounted on said terminal base; and a lug formed of an electrically conductive material and connected to said second terminal, said lug extending from said second terminal to a position proximate said first portion of said mounting member and being positioned to engage a central contact of the lamp, whereby electrical connections to said lamp and socket assembly permit substantially unhindered flow of air through said air passage between said socket assembly and said housing.

UNITED STATES PATENT AND TRADEMARK OFFICE
CERTIFICATE OF CORRECTION

PATENT NO. : 4,142,227

DATED : Feb. 27, 1979

INVENTOR(S) : Wallace R. Aikens

It is certified that error appears in the above-identified patent and that said Letters Patent are hereby corrected as shown below:

Col. 10, line 39, cancel beginning with "15. A ventilated adjustable reading light fixture" to and including "thereof by way of said channels." in col. 10, line 65, and insert the following claim:

15. A ventilated adjustable reading light fixture comprising:

a support having an opening;

a hollow housing adjustably mounted within said opening and having front and rear openings on opposite sides of said support;

a socket assembly mounted at one end of said housing proximate said rear opening to define an airflow passage from outside said housing past said socket assembly and into the interior of said housing, said socket assembly being adapted to engage a lamp to be located within said housing,

UNITED STATES PATENT AND TRADEMARK OFFICE
CERTIFICATE OF CORRECTION

PATENT NO. : 4,142,227

DATED : Feb. 27, 1979

INVENTOR(S) : Wallace R. Aikens

It is certified that error appears in the above-identified patent and that said Letters Patent are hereby corrected as shown below:

said housing including front and rear portions and a plurality of channels formed on the exterior surface thereof, said channels being separated by corresponding ridges, the outer surface of said ridges forming the outer periphery of said housing, said channels extending between said front and rear portions of said housing, whereby air may flow from the rear portion of said housing to the front portion thereof by way of said channels.

Signed and Sealed this

Seventh Day of August 1979

[SEAL]

Attest:

Attesting Officer

LUTRELLE F. PARKER

Acting Commissioner of Patents and Trademarks